United States Patent
Neter et al.

(10) Patent No.: US 6,951,453 B2
(45) Date of Patent: *Oct. 4, 2005

(54) INJECTION MOLD COOLING TUBE WITH POROUS INSERT

(75) Inventors: Witold Neter, Newnan, GA (US); Joachim Johannes Niewels, Thornton (CA); Richard Matthias Unterlander, Nobleton (CA); Tomasz Uracz, Everett (CA); Zbigniew Romanski, Mississauga (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/766,037

(22) Filed: Jan. 29, 2004

(65) Prior Publication Data

US 2004/0258791 A1 Dec. 23, 2004

Related U.S. Application Data

(63) Continuation of application No. 10/246,916, filed on Sep. 19, 2002, now Pat. No. 6,737,007.

(51) Int. Cl.[7] .............................................. B29C 45/73
(52) U.S. Cl. ....................... 425/526; 425/446; 425/556; 425/571
(58) Field of Search ................................ 425/571, 446, 425/526, 556; 264/538, 336

(56) References Cited

U.S. PATENT DOCUMENTS

| | | |
|---|---|---|
| 3,078,508 A | 2/1963 | Martin, Jr. |
| 3,947,205 A | 3/1976 | Edwards |
| 4,047,873 A | 9/1977 | Farrell |
| 4,102,626 A | 7/1978 | Scharrenbroich |
| 4,208,177 A | 6/1980 | Allen |
| 4,295,811 A | 10/1981 | Sauer |
| 4,304,542 A | 12/1981 | Sauer |
| 4,309,380 A | 1/1982 | Sauer |
| 4,592,719 A | 6/1986 | Bellehache et al. |
| 4,729,732 A | 3/1988 | Schad et al. |

(Continued)

FOREIGN PATENT DOCUMENTS

| | | |
|---|---|---|
| EP | 0 266 804 A2 | 5/1988 |
| EP | 0 700 770 A2 | 3/1996 |
| EP | 0 283 664 B2 | 10/1996 |
| JP | 56-113433 | 9/1981 |
| JP | 61-120723 | 6/1986 |
| JP | 07-276485 A | 10/1995 |
| WO | WO 97/39874 | 10/1997 |
| WO | WO 03/086728 A1 | 10/2003 |

OTHER PUBLICATIONS

Mikell Knights, Pourous Molds' Big Draw, Plastics technology Online, Mar. 2001, published on the internet at palsticstechnology.com.

Scott W. Hopkins, Porous Aluminum Mold Materials: The New Thermoform Tooling Advantage, International Mold Steel, Inc., published on the internet at irnsteel.com.

*Primary Examiner*—Tim Heitbrink
(74) *Attorney, Agent, or Firm*—Katten Muchin Rosenman LLP

(57) ABSTRACT

An injection-molding machine cooling tube, which cools molded plastic parts, includes a porous cooling tube having an outer surface and an inner surface. Preferably, the porous cooling tube has a porosity in the range of 3–20 microns. A cooling fluid passageway is preferably disposed adjacent the porous cooling tube outer surface and is configured to carry a cooling fluid to extract heat from the porous cooling tube. Fluid flow structure, preferably a vacuum, is configured to cause a molded plastic part inside the porous cooling tube to expand into contact with at least a portion of the inner surface of the porous cooling tube.

21 Claims, 8 Drawing Sheets

U.S. PATENT DOCUMENTS

| | | |
|---|---|---|
| 4,872,827 A | 10/1989 | Noda |
| 5,051,085 A | 9/1991 | Masumoto |
| 5,788,926 A | 8/1998 | Oda et al. |
| 5,804,127 A | 9/1998 | Takatori et al. |
| 5,837,299 A | 11/1998 | Bright et al. |
| 5,850,590 A | 12/1998 | Furuta et al. |
| 6,042,361 A | 3/2000 | Murphy |
| 6,171,541 B1 | 1/2001 | Neter et al. |
| 6,190,157 B1 | 2/2001 | Hofstetter et al. |
| 6,332,770 B1 | 12/2001 | Oueslati et al. |
| 6,461,556 B1 | 10/2002 | Neter |
| 6,475,422 B1 | 11/2002 | Neter et al. |
| 6,737,007 B2 * | 5/2004 | Neter et al. .......... 425/556 |
| 2001/0048988 A1 | 12/2001 | Forte et al. |
| 2002/0074687 A1 | 6/2002 | Neter et al. |
| 2002/0088767 A1 | 7/2002 | Saito et al. |

* cited by examiner

INJECTION MOLD COOLING TUBE WITH POROUS INSERT

The present application is a continuation of U.S. patent application Ser. No. 10/246,916 filed Sept. 19, 2002, now U.S. Pat. No. 6,737,007 incorporated herein by reference.

BACKGROUND OF THE INVENTION

1. Field of the Invention

The present invention relates, in general, to cooling tubes and is particularly, but not exclusively, applicable to cooling tubes used in a plastic injection-molding machine to cool plastic parts, such as plastic parisons or preforms. More particularly, the present invention relates to a structural configuration of these cooling tubes, and also to method of manufacturing and using such tubes, for example in the context of a manufacturing process for preforms made from polyethylenetetraphthlate (PET) or the like.

2. Related Art

In order to accelerate cycle time, molding machines have evolved to include post mold cooling systems that operate simultaneously with the injection molding cycle. More specifically, while one injection cycle is taking place, the post mold cooling system, typically acting in a complementary fashion with a robotic part removal device, is operative on an earlier formed set of molded articles that have been removed from the mold at a point where they are still relatively hot, but sufficiently solid to allow limited handling.

Post mold temperature conditioning (or cooling) molds, nests or tubes are well known in the art. Typically, such devices are made from aluminum or other materials having good thermal conductivity properties.

To improve cooling efficiency and cycle time performance, EP patent 0 283 644 describes a multi-position take-out plate that has a capacity to store multiple sets of preforms for more than one injection cycle. In other words, each set of preforms is subjected to an increased period of accentuated conduction cooling by retaining the preforms in the cooling tubes for more than one injection cycle. With increased cooling, the quality of the preforms is enhanced. At an appropriate point in time, a set of preforms is ejected (usually by a mechanical ejection mechanism) from the take-out plate onto a conveyor to allow a new set of preforms to be inserted into the now vacant set of cooling tubes. EP patent 0 283 644 is incorporated herein by reference.

In many other cooling tube arrangements, the preform (at some point, if not from the point of introduction) looses contact with the internal side walls of the cooling tube, which loss of thermal contact lessens cooling efficiency and causes uneven cooling. As will be understood, uneven cooling can induce part defects, including deformation of overall shape and crystallization of the plastic (resulting in areas that are visibly hazed). Furthermore, lack of contact can cause ovality across the circumference of the preform, while the loss of the cooling effect can mean that a preform is removed from the cooling tube at an excessively high temperature. In addition to causing surface scratching and overall dimensional deformation, premature removal of a preform at an overly high temperature can also result in the semi-molten exterior of preform sticking either to the tube or another preform; all these effects are clearly undesirable and result in part rejection and increased costs to the manufacturer.

European patent EP 0 266 804 describes an intimate fit cooling tube that is held within an end-of-arm-tool (EOAT) of a robot. The intimate fit cooling tube is water cooled and is arranged to receive a preform shortly after it has attained the glass-transition temperature that allows handling of its form without catastrophic deformation. More particularly, after the preform has undergone some cooling within the closed mold, the mold is opened, the EOAT extended between the cavity and core sides of the mold and the preform off-loaded from a core into the cooling tube that then acts to cool the exterior of the preform by a conduction process. However, as the preform cools it will shrink and therefore may loose contact across its entire circumference with the cooling tube yielding an uneven cooling effect.

U.S. Pat. Nos. 4,102,626 and 4,729,732 are further typical of prior art systems in that they show a cooling tube formed with an external cooling channel machined in the outer surface of the tube body, a sleeve is then assembled to the body to enclose the channel and provide an enclosed sealed path for the liquid coolant to circulate around the body.

WO 97/39874 discloses a tempering mold that has circular cooling channels included within its body. EP 0 700 770 discloses another configuration that includes an inner and outer tube assembly to form cooling channels therebetween.

U.S. Pat. No. 4,208,177 discloses an injection mold cavity containing a porous element that communicates with a cooling fluid passageway subjecting the cooling fluid to different pressures to vary the flow of fluid through the porous plug.

U.S. Pat. No. 4,047,873 discloses an injection blow mold in which the cavity has a sintered porous sidewall that permits a vacuum to draw the parison into contact with the cooling tube sidewall.

U.S. Pat. No. 4,295,811 and U.S. Pat. No. 4,304,542 disclose an injection blow core having a porous metal wall portion.

A "Plastics Technology Online" article entitled "Porous Molds' Big Draw", by Mikell Knights, printed from the Internet on Jul. 27, 2002, discloses a porous tooling composite called METAPOR™. The article discloses the technique of polishing this material to close slightly the pores to improve the surface finish and reduce the porosity.

An article from International Mold Steel, Inc., entitled "Porous Aluminum Mold Materials", by Scott W. Hopkins, printed from the Internet on Jul. 27, 2002, also discloses porous aluminum mold materials. The materials and applications disclosed in the above two articles refer to vacuum thermoforming of plastics in the mold itself, in which preheated sheets of plastic are drawn into a single mold half via a vacuum drawn through the porous structure of the mold half.

SUMMARY OF THE INVENTION

According to a first aspect of the present invention, structure and/or steps are provided for a tube assembly for operating on a malleable molded plastic part. The tube assembly comprising a porous tube having a profiled inside surface, and a vacuum structure configured to cooperate with the porous tube to provide, in use, a reduced pressure adjacent the inside surface. The reduced pressure causes an outside surface of the malleable molded plastic part, locatable within the tube assembly, to contact the inside surface of the porous insert so as to allow a substantial portion of the outside surface of the malleable part, upon cooling, to attain a profile substantially corresponding to the profile of the inside surface. In an embodiment of the invention, the porous tube is cylindrically-shaped, and the vacuum structure is provided by locating the porous tube in a tube body and by providing at least one vacuum channel adjacent the outside surface of the porous tube, in use, for connection to a vacuum source.

The inside surface of the porous tube having an internal profile that is substantially (if not highly and accurately toleranced to) the final dimensions of the molded part, the porous tube of the various embodiments of the present invention effectively causes, under cooling, a re-shaping of the molded part to its exact final shape defined by the profile of the insert. Indeed, the reduced pressure/effective vacuum acting through the porous material essentially acts to draw the malleable preform into the final shape whilst ensuring that cooling is optimized by continuous surface contact with a thermally efficient heat dissipation material and path.

According to a second aspect of the present invention, injection molding machine structure and/or steps are provided with a molding structure that molds at least one plastic part. Furthermore, at least one porous cooling cavity is configured to hold and cool the at least one plastic part after it has been molded by the molding structure. At least one vacuum channel is respectively configured to provide a lower-than-ambient pressure to the at least one porous cavity to cause the at least one plastic part to contact the inside surface of the at least one porous cavity.

According to a third aspect of the present invention, a method for shaping a malleable molded plastic part including the steps of: (i) receiving the molded plastic part into a porous tube; (ii) providing a reduced pressure adjacent a profiled inside surface of the porous tube causing a portion of an outside surface of the molded plastic part to move into contact therewith and thereby attain a substantially corresponding shape; and (iii) extracting heat from the molded plastic part through a heat dissipation path to solidify the molded plastic part at least to the extent required to ensure that the shape of the outside surface of the molded plastic part is preserved; and (iv) ejecting the molded plastic article; wherein the outer surface of the molded plastic part is provided with a final shape that is defined by the profiled inside surface profile of the porous tube.

According to a fourth aspect of the present invention, structure and/or steps are provided for a tube assembly for operating on a malleable molded plastic part. The tube assembly comprising a tube body, and a porous insert located in the tube body. The porous insert includes an inside surface and an outside surface, the inside surface profiled to reflect at least a portion of the profile of the molded plastic part. The tube assembly further includes at least one vacuum channel in fluid communication with the porous insert. The vacuum channel configured for connection, in use, with a vacuum source to provide a reduced pressure adjacent the inside surface to cause an outside surface of the malleable molded plastic part, locatable within the tube assembly, to contact the inside surface so as to allow a substantial portion of the outside surface of the malleable part, upon cooling, to attain a profile substantially corresponding to the profile of the inside surface. The tube assembly also includes a cooling structure configured for connection, in use, with a heat dissipation path for cooling the molded plastic part in contact with the inside surface of the porous insert.

Preferably, the porous insert has porosity in the range of about 3–20 microns. A cooling fluid passageway is disposed in the tube body adjacent the porous insert and is configured to carry a cooling fluid to extract heat from the porous insert.

According to another aspect of the present invention, structure and/or steps are provided for a tube assembly. The tube assembly comprising a tube with an inside surface provided on a porous substrate, and a fluid flow structure. The fluid flow structure is configured to cooperate with the porous substrate to cause, in use, a malleable molded plastic part, locatable within the tube assembly, to be drawn into contact with the inside surface so as to allow a substantial portion of an outside surface of the malleable part, upon cooling, to attain an outside profile substantially corresponding to the profile of the inside surface.

According to an embodiment of the invention, the porous substrate includes an inside surface and an outside surface, the inside surface profiled to reflect at least a portion of the profile of the molded plastic part; and a vacuum channel located adjacent the outer surface, the vacuum channel supporting, in use, an initial establishment of a differential pressure from the outside surface of the porous substrate to the inside surface thereof, to induce contact, in use, between the received molded plastic part and the inside surface.

According to yet another aspect of the present invention, structure and/or steps are provided for an end-of-arm tool. The end-of-arm tool comprising a carrier plate for mounting, in use, to a robot in a molding system, and at least one tube assembly arranged on the carrier plate. The tube assembly is configured for receiving, in use, a molded plastic part. The tube assembly comprising a porous tube having an inside surface and an outside surface, the inside surface profiled to reflect at least a portion of the profile of the molded plastic part, and a vacuum structure. The vacuum structure is configured to cooperate with the porous tube to provide, in use, a reduced pressure adjacent the inside surface to cause an outside surface of a malleable molded plastic part, locatable within the tube assembly, to contact the inside surface of the porous insert so as to allow a substantial portion of the outside surface of the malleable part, upon cooling, to attain a profile substantially corresponding to the profile of the inside surface.

According to a further aspect of the present invention, structure and/or steps are provided for a molded plastic part with the shape of at least a portion of its outside surface defined by a profiled inside surface of a porous tube. The molded plastic part is formed by the process of: (i) receiving a malleable molded plastic part into the porous tube; (ii) reducing pressure adjacent the profiled inside surface of said porous tube causing the portion of the outside surface of the molded plastic part to move into contact with the profiled inside surface of the porous tube, thereby to attain a shape substantially corresponding to the profiled inside surface; and (iii) extracting heat from the molded plastic part through a heat dissipation path to solidify the molded plastic part sufficiently such that the outer shape of the molded plastic part is preserved. Whereby the portion of the outside surface of the molded plastic part takes on a surface finish reflecting that of the profiled inside surface of the porous insert. Preferably, the porous tube is formed of a porous substrate with the profiled inside surface having interstitial spaces preferably within a range of about 3 to 20 microns.

The present invention advantageously provides a cooling tube structure that functions to cool rapidly and efficiently a just-molded plastic part located within the cooling tube, thereby improving robustness of the preform and generally enhancing cycle time. Moreover, in the context of cooling PET and the unwanted production of acid aldehyde arising from prolonged exposure of the preform to relatively high temperatures, the rapid cooling afforded by the present invention beneficially reduces the risk of the presence of unacceptably high levels of acid aldehyde in the finished plastic product, such as a drink container. Beneficially, the present invention seeks to maintain a required and defined shape of the molded part, such as a preform.

BRIEF DESCRIPTION OF THE DRAWINGS

Exemplary embodiments of the present invention will now be described with reference to the accompanying drawings, in which.

DETAILED DESCRIPTION OF THE PRESENTLY PREFERRED EXEMPLARY EMBODIMENTS

The present invention will now be described with respect to embodiments in which a porous cooling tube is used in a plastic injection molding machine, although the present invention is equally applicable to any technology in which, following part formation, cooling of that part is undertaken by a cooling tube or the like. For example, the present invention can find application in a part transfer mechanism from an injection molding machine and a blow-molding machine.

Figure 1:
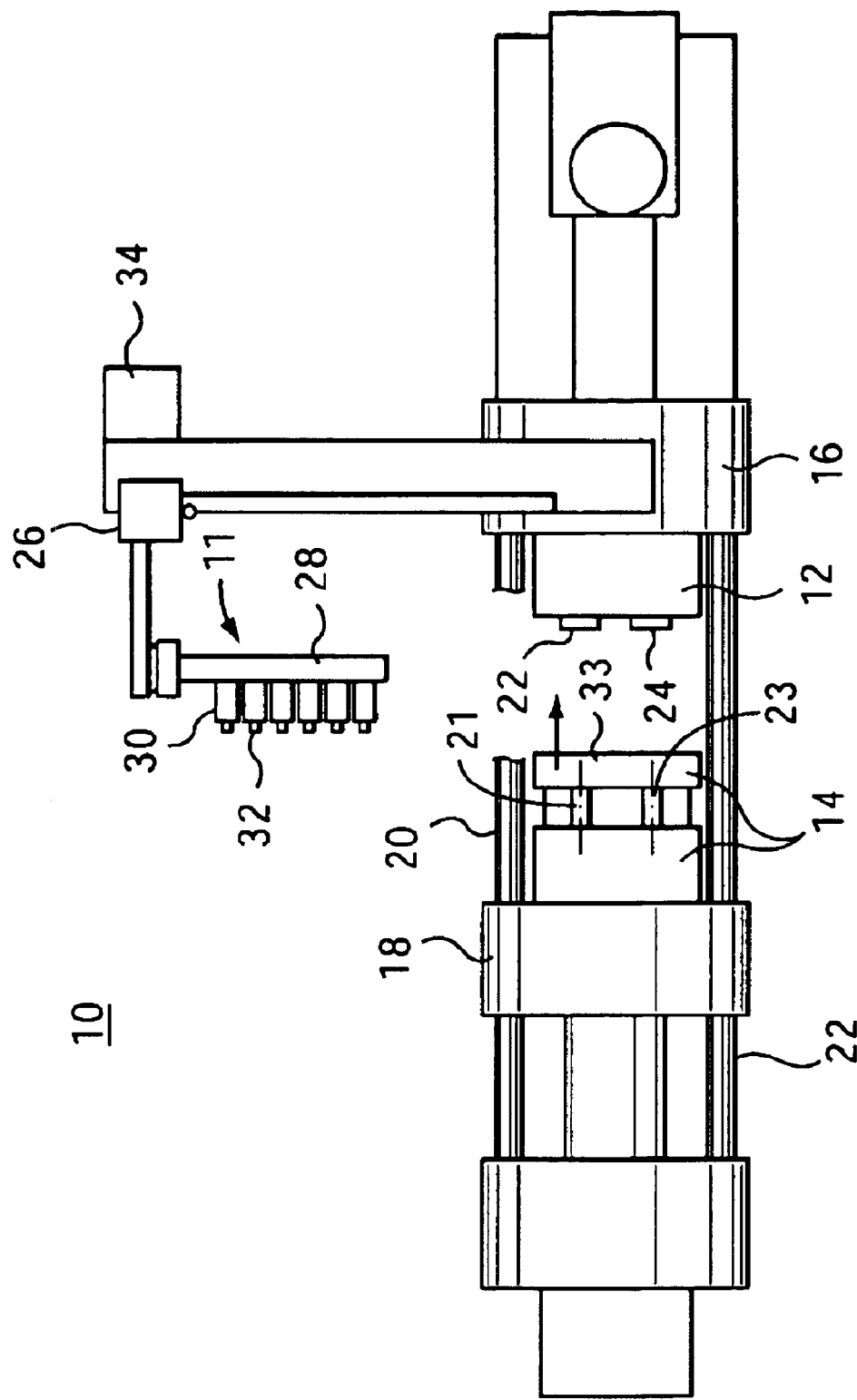
FIG. 1 is a plan view of a typical injection molding machine including a robot, and end-of-arm tool.

FIG. 1 shows a typical injection molding machine 10 capable of co-operating with a device supporting the cooling tube of the present invention. During each injection cycle, the molding machine 10 produces a number of plastic preforms (or parisons) corresponding to the number of mold cavities defined by complementary mold halves 12, 14 located within the machine 10.

The injection-molding machine 10 includes, without specific limitation, molding structure such as a fixed platen 16 and a movable platen 18. In operation, the movable platen 18 is moved relative to the fixed platen 16 by means of stroke cylinders (not shown) or the like. Clamp force is developed in the machine, as will readily be appreciated, through the use of tie bars 20, 22 and a machine clamping mechanism (not shown) that typically generates a mold clamp force (i.e. closure tonnage) using a hydraulic system. The mold halves 12, 14 together constitute a mold generally having one or more mold cavities 22, 24, with the mold halves 12, 14 each located in one of the movable platen 14 and the fixed platen 16. A robot 26 is provided, adjacent the fixed 16 and movable platen 14, to carry an end of arm tool (EOAT) 28, such as a take-out plate. The take-out plate 28 contains a number of preform cooling tubes 30 at least corresponding in number to the number of preforms 32 produced in each injection cycle, and may be a multiple thereof. In use, in a mold open position (as shown in FIG. 1), the robot 26 moves the take-out plate into alignment with, typically, a core side of the mold and then waits until molded articles (e.g. preforms 32) are stripped from respective cores into respectively aligned cooling tubes 30 by operation of a stripper plate 33.

Cooling tubes 30 are generally shaped to reflect the external profile of the molded article (e.g. preform 32), so in the context of a PET preform the cooling tubes 30 are preferably cylindrically-shaped, open-ended, hollow tubes, each having a channel at the base thereof connected to a vacuum or suction unit 34 operational to draw and/or simply hold the preforms 32 in the tubes 30.

Generally, the take-out plate 28 will be cooled either by connection to a suitable thermal sink and/or by a combination of techniques, including internal water channels, as will be understood.

Figure 2:
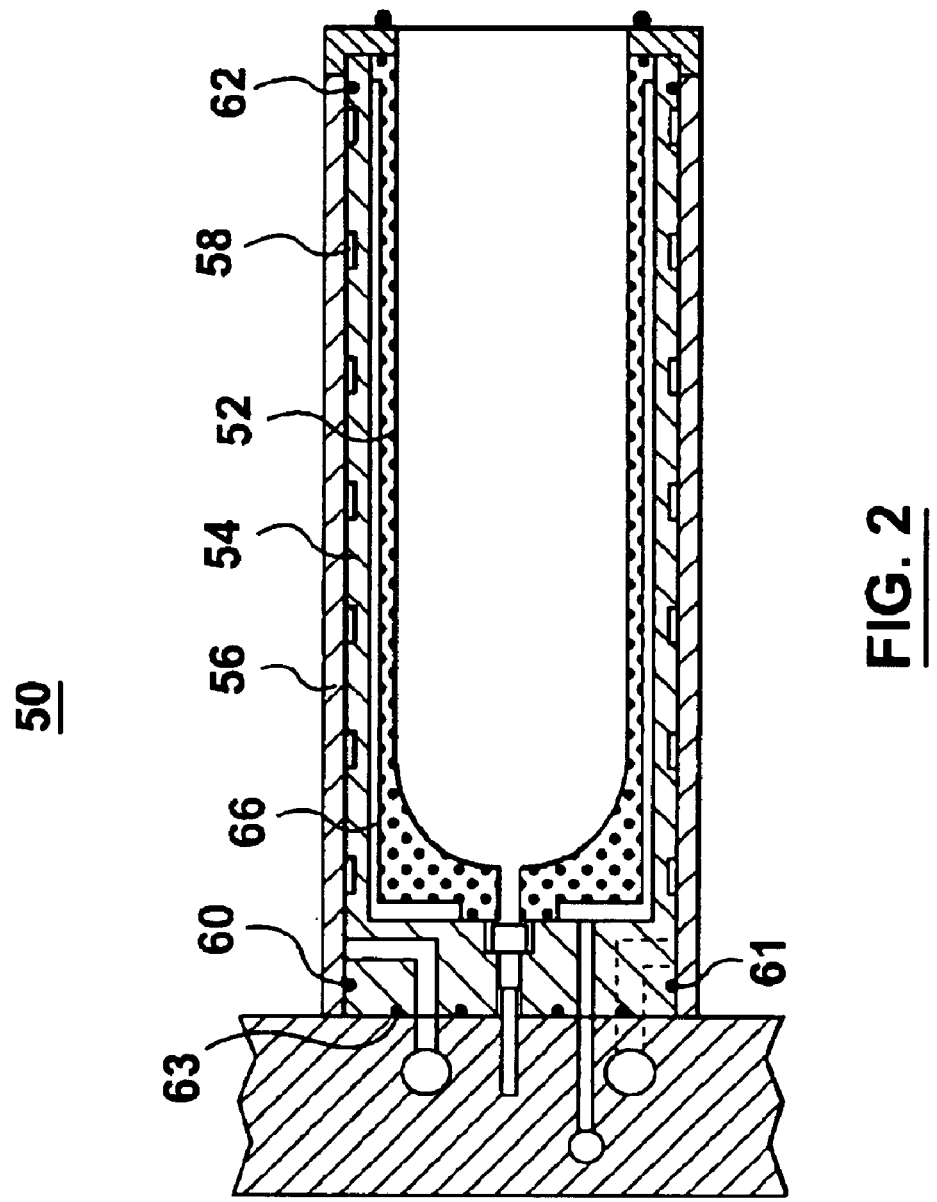
FIG. 2 depicts a section through a cooling tube assembly according to a preferred embodiment of the present invention.

FIG. 2 shows a cooling tube assembly 50 comprising an inner porous insert 52 made, preferably, of a material such as porous aluminum having a porosity in the range of about 3 to 20 microns. The porous properties of the substrate are generally achieved from either its material configuration or a chemical removal (or adjustment) treatment process in which interstitial spaces are induced into the substrate, thereby producing an internal structure that is somewhat analogous to either honeycomb or a hardened sponge. The present invention can make use of communicating channels through the substrate material having a size outside the range of 3 to 20 microns, albeit that readily commercially available materials, such as METAPOR™ and POR-CERAX™ (both manufactured by the International Mold Steel Corporation), are discussed with respect to the preferred embodiments described herein. Porosity is, in any event, a function of surface finish, and machining of working of the surface can affect porosity through the material, as will be understood. In a preferred embodiment, the inner porous insert 52 is made from a structure having definite strength and mechanically resilient properties, although the inner porous insert could also be made from substances like graphite. It is preferably that the inner porous insert 52 is a thermal conductor, with it being particular preferably that the thermal conduction properties are good, e.g. a metal-based or sintered composite material.

As will be understood, METAPOR™ is combination of aluminum and epoxy resin having a mix ratio of between about 65–90% aluminum powder and 35–10% epoxy resin.

A typical cooling tube assembly 50 may have an internal length dimension of about 100 millimetres (mm), with an interior diameter of about 25 mm and an outer diameter of about 40 mm, with these dimensions reflecting the size of the molded article. Of course, tubes may be made of different diameters and lengths to suit the particular preform shape being cooled.

From a practical perspective, the porous insert 52 is preferably located in a tube body 54, which is surrounded by a sleeve 56. Cooling channels (or passageways) 58 are optionally cut or otherwise formed adjacent to the tube body 54, and convey a cooling fluid (e.g. air, gas, or liquid) to cool the body 54 and the insert 52, thus drawing heat from the molded plastic part in the porous insert 52. Each cooling channel preferably configured to have a cross-section comprising a plurality of arcuate, elongated slots which extend around greater than 50% of a circumference of an inside diameter of a respective cooling cavity. Alternatively, the tube body 54 could simply be directly thermally coupled to a heat sink to reduce a combined overall weight of the tubes and end-of-arm-tool 28, provided that the heat sink is capable of drawing sufficient heat from a preform in unit time.

Seals 60–63 between the sleeve 56 and the tube body 54 contain the cooling fluid in the grooves 4. Channels 66 are cut or otherwise formed in the exterior surface of porous insert 52 and provide a means to apply a vacuum through the porous structure of the porous insert 52.

Figure 3:
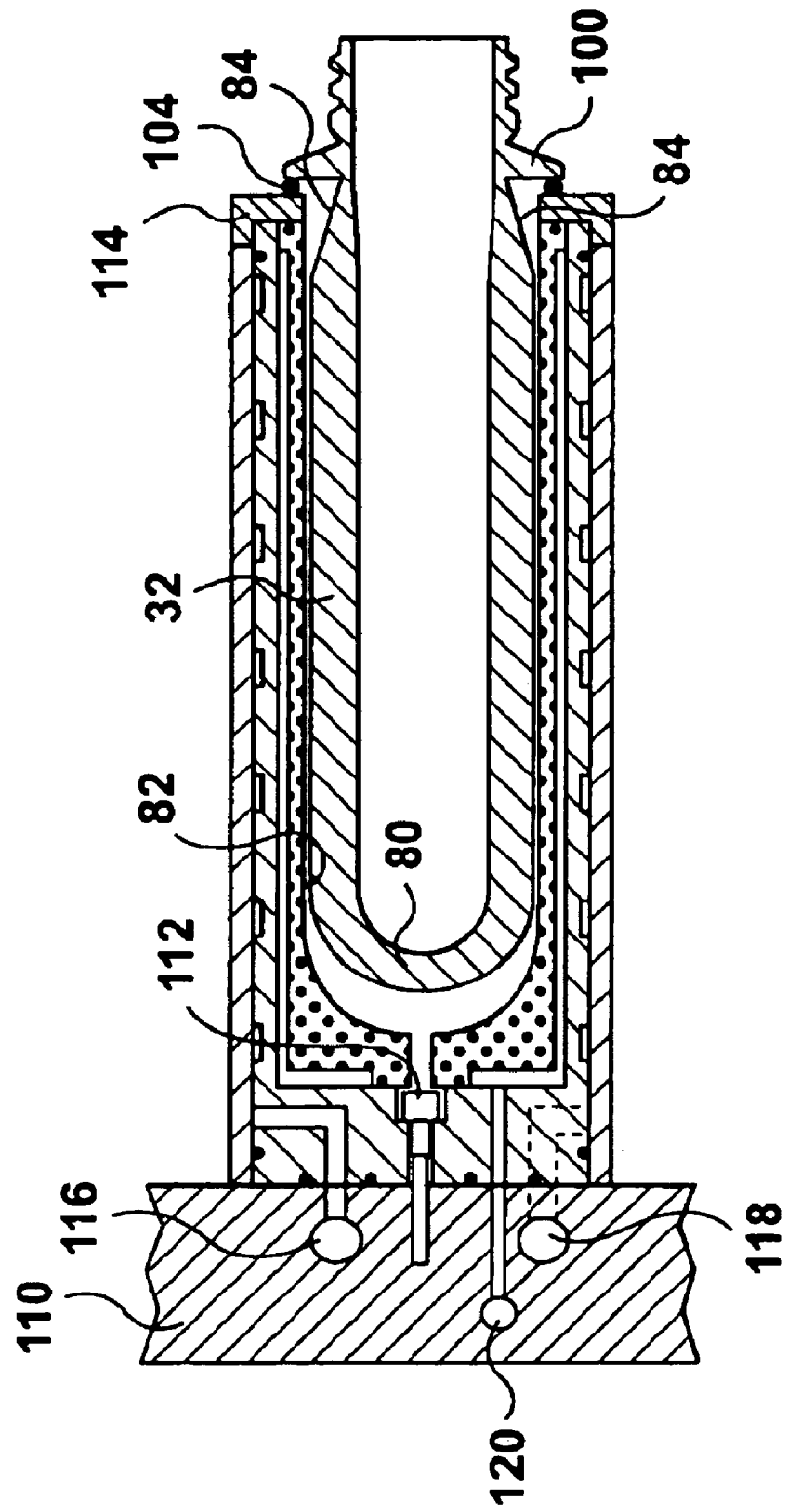
FIG. 3 depicts a sectional, but exaggerated view, through the cooling tube assembly of the FIG. 2 embodiment, with a freshly molded part just loaded.
Figure 4:
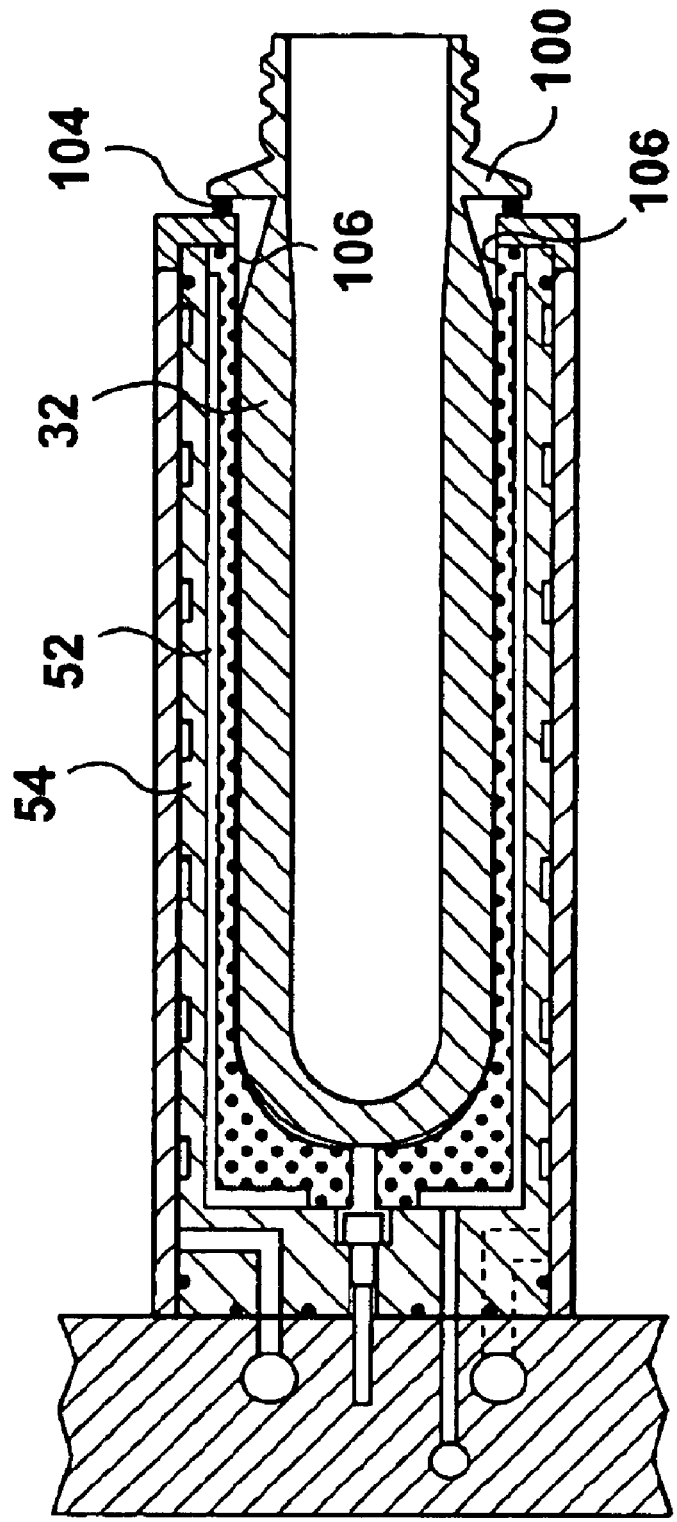
FIG. 4 depicts a section through the cooling tube assembly of the FIG. 2 at a later point in time.

Other than the channels 66, the outer surface of the porous insert 52 is configured such that a good surface contact is maintained between the insert 52 and the tube body 54, thereby to optimize heat transfer from the porous insert to the molded plastic part. The vacuum is applied through the porous insert such that a freshly loaded molded plastic part 32, shown in FIG. 3, is caused to expand in size to touch an inner surface 82 of the porous insert, as shown in FIG. 4. Thus, heat is conducted from the molded plastic part 32 to and through the porous insert 1 to the cooled tube body 54. It is noted that the position of a dome portion 80 of the preform 32 is exaggerated in FIG. 3 and that FIG. 3 is representative of a time when the preform is being introduced into the cooling tube assembly 50.

Under application of suction or vacuum, a lower-than-ambient pressure is present outside of insert 52, thus causing air to flow through the porous insert 52 from the inside surface 82 thereof and into channels 66. This suction, in turn, causes a lower-than-ambient pressure at the outer surface of the molded plastic part, causing it to move into contact with the inner surface 82 of the porous insert 52.

In a PET environment with a METAPOR™ insert having 3–20 micron interstitial spaces, operational vacuum pressures for the system are achievable within the range of about 10 to 30 inches of mercury (using a U3.6s Becker evacuation pump). However, it will be understood that the applied vacuum pressure is a ultimately determined by (and is a function of) the mechanical properties of the plastics material.

Of course, rather than applying a vacuum from the outside of the preform, a positive pressure may be applied (by means of a fluid injector and lip seals) to the inside of the preform, to cause the preform to contact at least a portion of the cooling tube inside surface, although this requires a sealed system. Any appropriate pressure differential may therefore be applied between the inside surface of the cooling tube and the outside surface of the plastic part, depending on the shape of the part and the cycle time provided for the cooling. It is preferred that the entire outer surface of the preform (cylindrical outer surface and spherical outer surface at the distal tip, i.e. the dome 80) contact the porous insert cooling tube, although an outer profile of the preform may, in fact, prevent this along, for example any inwardly tapering portion 84 proximate the neck finish of the preform 32. However, the cooling tube and vacuum structure may be designed to bring any portion(s) of the preform into contact with the cooling tube, depending on the plastic part design and the portion(s) thereof needing cooling. Further, the vacuum (or positive pressure) may be applied in one, two, or three or more stages to effect various cooling profiles of the plastic part. For example, a thick portion of a preform may be brought into immediate contact with the cooling tube, while a thinner portion of the preform may be brought into contact with the cooling tube at a later time. In general, the preform is in contact with the cooling tube 50 for sufficient time only to allow robust handling of the preform without any fear of damage arising, with this dependent upon preform material, size and cross-sectional profile.

The porosity of the porous insert 52 can be lowered to improve the surface finish (i.e. inner surface 82) of the porous insert 52 in contact with the molded plastic part and thereby minimize any marking of the molded part's surface. Reducing the porosity of the insert 52 also, however, reduces the flow of air passing therethrough. A modest flow reduction can be tolerated since this does not greatly impede the effect of the vacuum created or diminish its intensity, especially since, once the molded part's surface contacts the insert, all airflow ceases. The airflow rate only affects the speed at which the vacuum is created when the molded part 32 initially enters the tube 52. Porosity reduction is achieved by milling and grinding procedures, whereas additional process steps of stoning or electric discharge can clear debris from surface interstitial spaces to increase porosity. In any event, flow rate through the material is a function of both applied pressure and porosity, as will be readily understood.

Inside the cooling tube 50, due to the partially cooled, but still malleable, state of the molded part on entry into the molded plastic part, the vacuum will cause the molded plastic part to expand in diameter and perhaps length. The molded part is subjected to a vacuum applied to most of its external surface, while its internal surface is exposed to ambient pressure.

Figure 5:
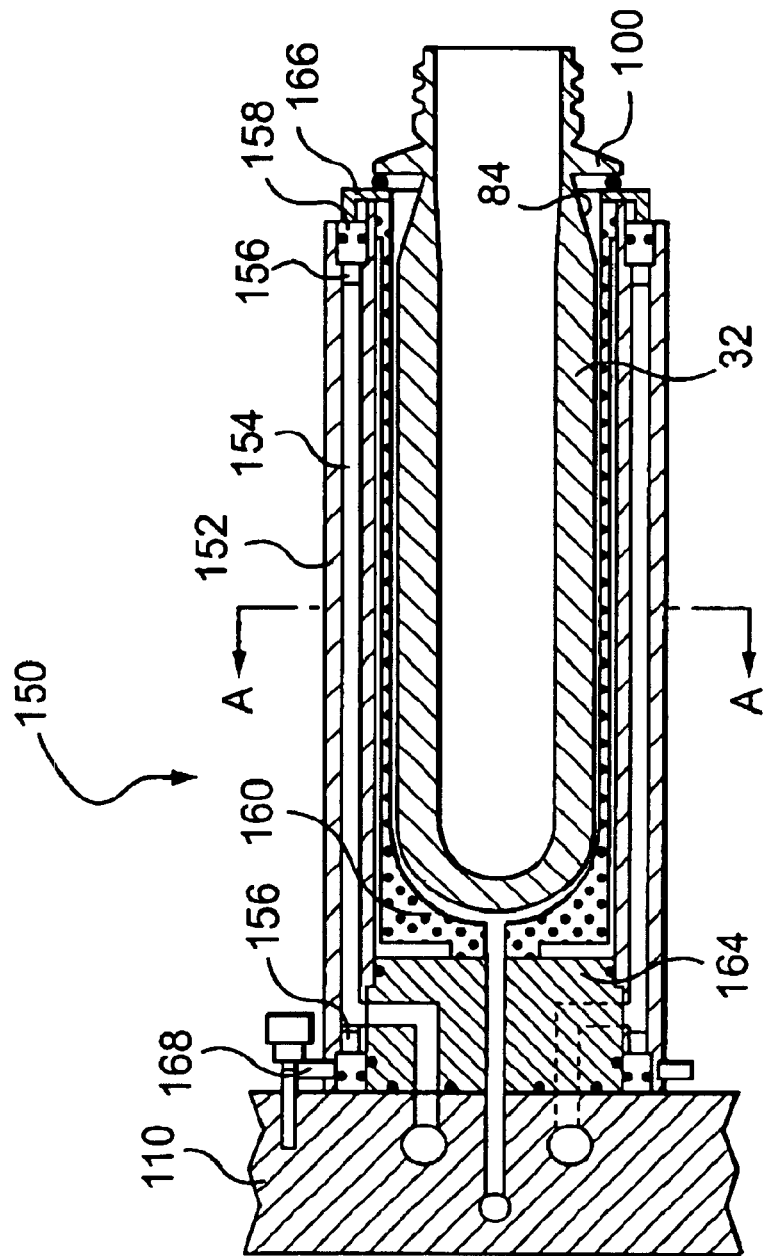
FIG. 5 depicts a section through the cooling tube assembly of an alternate embodiment.

In FIG. 5, support ledge 100 of the molded part 32 prevents the part from entering further into the tube 50 as the part cools and shrinks. In this case, the vacuum draws the closed end of the part further into the tube while the support ledge prevents the opposed end from following. In all embodiments the vacuum causes the part to change shape to substantially eliminate the clearance that initially exists between the part's outer surface and the corresponding inner surface of the porous insert 52.

In the case of molded plastic parts having diametric features, such as the inwardly tapered portion 84, these will not be substantially altered in shape during this expansion phase. The configuration and size of the internal dimensions of the porous insert 52 are made such that the diameter matches or is slightly larger than the corresponding diameter of the part being cooled, thus preventing substantial disfiguring of the plastic part shape.

End seal 104 (of FIG. 3) at the open end of the cooling tube 50 provides a means to initially establish (and as necessary maintain) the vacuum within the assembly and to continue to cause the part 8. If there are sections of the porous insert 52 that do no engage with portions of the preform, such as region 106 shown in FIG. 4 below support ledge 100, then the end seal 104 is required to ensure that the molded parts remains in contact with the inner wall 82 and thereby to resist the effect of shrinkage of the part 8 as it cools, otherwise the end seal 104 may be omitted. If the vacuum were not present, shrinkage of the part 8 would cause a separation between the part's outer wall and the inner cooling wall of the insert 52 (and hence a resulting loss of suction), thereby greatly impeding the transfer of heat from the part to the insert 52 and into the cooling tube. Thus, the continuing provision of the vacuum ensures intimate contact between the molded part's outer surface and the insert's inner wall 82 is maintained to maximize cooling performance.

Returning to FIG. 3, the tube assembly 50 is preferably fastened to a carrier or take-out plate 110 by a screw 112. The insert 52 is retained in the assembly by a collar 114, which is threaded onto the end of the tube body 54 or fastened or otherwise coupled by any other conventional means. A cooling fluid channel inlet 116, and a cooling fluid channel outlet 118 are provided in the carrier plate 110. A vacuum channel (or passageway) 120 is also provided in the carrier plate 110. After sufficient cooling time has elapsed, the vacuum is replaced with pressurized airflow (by inversion of the vacuum pump function), and the part is ejected from the tube assembly 50 by this pressure.

Figure 6:
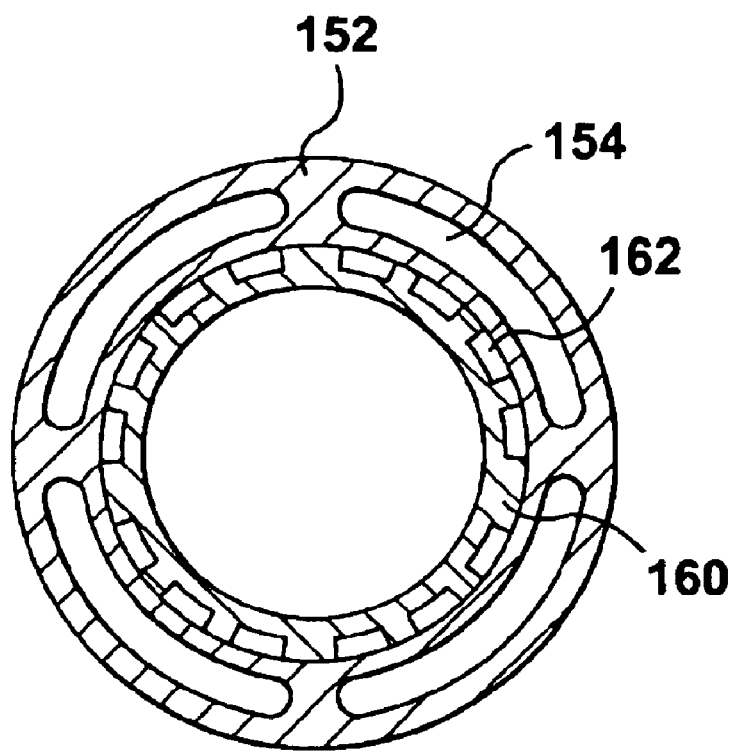
FIG. 6 depicts a view on section 5—5 of FIG. 5.

FIGS. 5 and 6 show an alternative embodiment for a cooling tube 150 in which the tube body 54 and the sleeve are 56 replaced with an extruded tube that contains integral cooling channels. An aluminum extrusion 152 forms the tube body and contains integral cooling channels 154 that are alternately connected to each other by grooves 156 at each end of the tube. Sealing rings 158 close the ends of the tube to complete the cooling circuit's integrity. A porous aluminum insert 160, having external grooves 162 that act as a channel for the vacuum, is located (inside the cooling tube 150) by a spacer 164 and a collar 166 attached to the tube by a thread or any other conventional fastening mechanism. The tube assembly is fastened to the carrier plate 110 by any suitable external clamping means, such as a bolt 168. This alternative embodiment has a lower cost of manufacture and an improved cooling efficiency by virtue of its extruded body component.

Figure 7:
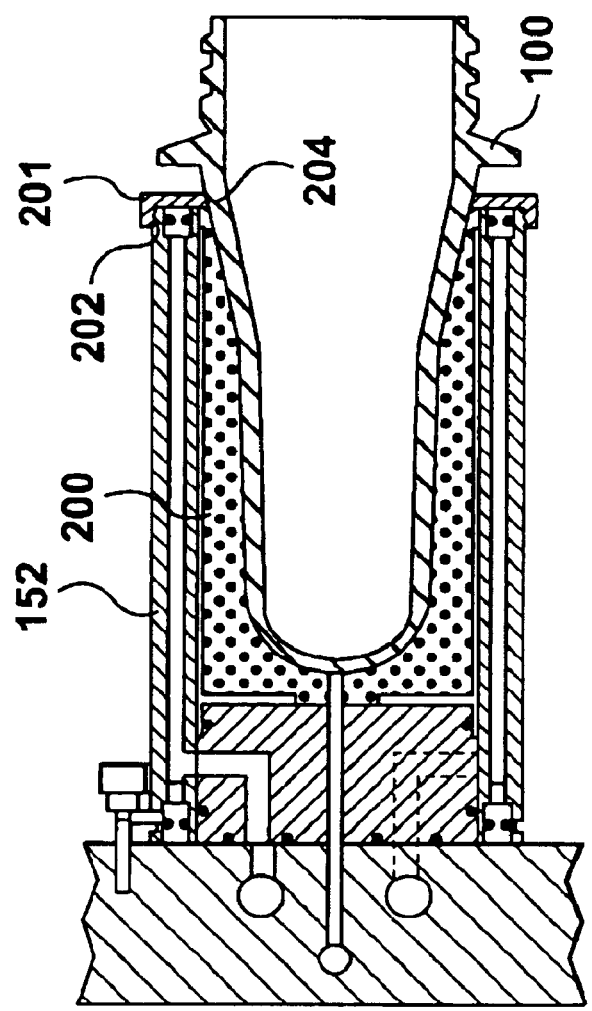
FIG. 7 depicts a section through the cooling tube assembly of a second alternate embodiment.
Figure 8:
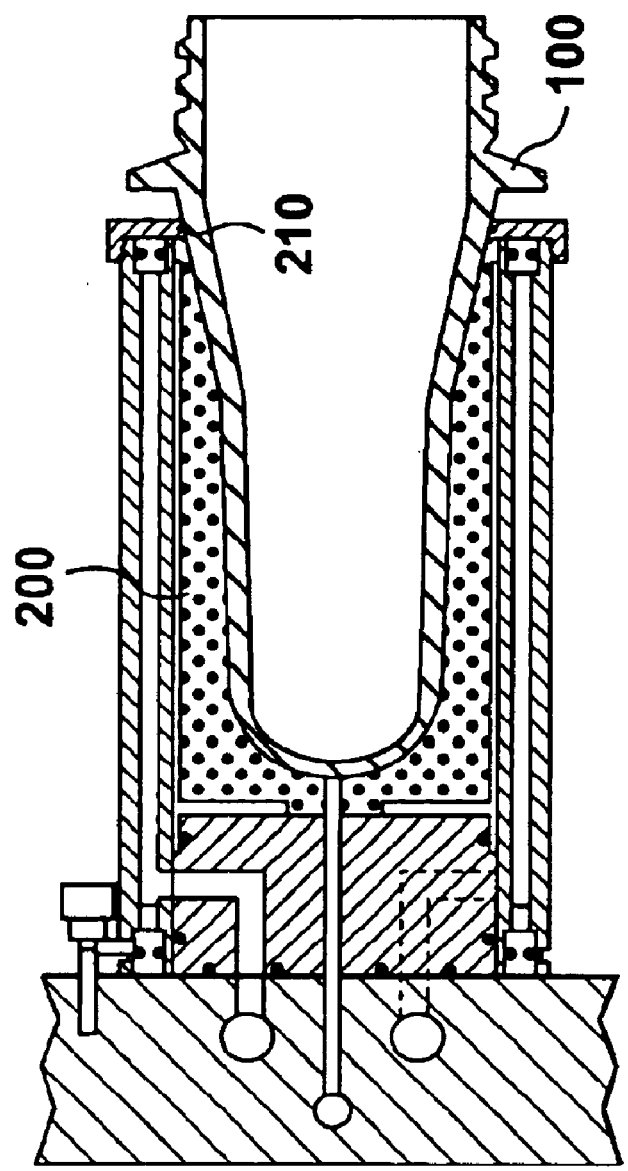
FIG. 8 depicts a section through the cooling tube assembly of a third alternate embodiment.

FIG. 7 shows a second alternative embodiment for cooling a molded part having a different shape. In this arrangement, the end seal (reference numeral 104 of FIG. 3) between the top of the cooling tube and the underside of the support ledge 100 is not necessary. A porous insert 200 is held within the extruded tube 152 by a collar 201 that is threaded 202 onto the top of the cooling tube (in this case the extruded tube 152) or fastened by any suitable means. The collar 152, typically made from aluminum or the like, extends inwardly to conform to the inner profiled shape 204 of an open end of the insert 200 that matches, or is slightly larger, than that of the part being cooled. The collar 201 provides a seal of sufficient efficacy to allow the vacuum applied to the porous insert to cause the part to expand in size to intimately fit against the inner surface of the insert and cool. In some cases it is preferred that the part has a looser fit in the tube when first entering it. In this event, FIG. 8 shows how a lip seal 210 can provide the necessary initial sealing to permit a vacuum to become effective after the loading of a looser fitting part.

Methods of constructing and using the cooling tubes (in an operational environment) of the present invention to accentuate cooling and part formation have been described above. Briefly, a porous cooling tube constructed in accordance with one of the embodiments of the present invention is manufactured by milling or extruding a cooling tube assembly having a porous cooling tube insert and, optional but preferable, cooling fluid channels. The porous insert may be polished, painted, or otherwise treated to reduce porosity and provide a finer finish to the exterior of the molded part. The cooling fluid channels may be wholly enclosed inside the tube, or may be formed by placing a sleeve over open channels formed in the outer surface of the porous insert. Vacuum channels may be milled or extruded on an outer surface of the porous insert, or may be provided with separate structure adjacent the porous insert outer surface. The closed end of the cooling tube may be machined into the tube, or may comprise a plug fitted into one open end of a cooling cylinder. Appropriate seals are then fitted to either end of the cooling tube to provide the required pressure management, as described above.

In operation, the just-molded plastic part is extracted from a mold cavity and carried by the carrier plate to a cooling station where one or a plurality of cooling tubes are positioned. The plastic part is inserted into the cooling tube and preferably sealed therein. Then, a vacuum (or partial vacuum) is applied through the porous insert from the outer surface thereof to the inner surface thereof, causing the plastic part to expand in length and diameter to contact the inner surface of the porous insert. The cooling fluid circulates through the cooling channels, extracting heat from the porous insert, which extracts heat from the molded part. When sufficient cooling is complete (when the exterior surfaces of the molded part have solidified and achieved sufficient rigidity), the vacuum is released and the molded part is ejected, for example, into a bin for shipping. If desirable, a positive pressure can be applied through the vacuum channels to force the molded part from the cooling tube.

Thus, what has been described is a novel cooling tube assembly for the improved cooling of partially cooled molded parts that provides a means to maintain intimate surface contact between the part's external surface and the internal cooled surface of the tube during the cooling cycle. The disclosed post mold cooling device preferably uses a vacuum to slightly expand the part to contact the cooled surface and to maintain contact as part cools, thereby counteracting shrinkage that tends to draw the part away from the cooled surface.

All U.S. and foreign patent documents, and articles, discussed above are hereby incorporated by reference into the Detailed Description of the Preferred Embodiment.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. For example, whilst the preferred embodiment of the present invention discusses the present invention in terms of a porous insert, it will be appreciated that the insert could, in fact, be realized by a thermally conductive but porous coating applied to a profiled housing, although use of an insert benefits ease of manufacture and assembly. The application of the cooling technology is not, as will be understood, limited to size or weight (of, e.g. preforms), with the defining criteria being the ability to establish a vacuum to encourage contact of an outer surface of the molded article with the inner surface of the porous profiled substrate. The scope of the following claims is to be accorded the broadest interpretation so as to encompass all such modifications and equivalent structures and functions.

What is claimed is:

1. A post-injection-molding cooling apparatus configured to cooperate with a vacuum structure said vacuum structure capable of cooling a just-injection-molded malleable injection molded plastic article received within the cooling apparatus said apparatus, comprising:

a porous member formed from a porous material, the porous member including (i) an inside surface that is profiled to substantially reflect a shape of a portion of an outside surface of the injection-molded plastic article, and (ii) a vacuum coupling structure;

wherein the vacuum coupling structure of the porous member is configured to cooperate with the vacuum structure to provide a reduced pressure adjacent the inside surface of the porous member to cause the portion of the outside surface of the malleable molded plastic article to contact the inside surface of the porous member so as to cause a conductive cooling of the outside surface of the malleable article.

2. The cooling apparatus of claim 1, wherein the vacuum coupling structure comprises an outside surface of the porous member.

3. The cooling apparatus of claim 1, wherein the vacuum coupling structure comprises at least one channel formed in an outside surface of the porous member.

4. The cooling apparatus of claim 1, wherein at least a portion of an outer surface of the porous member comprises a mounting surface configured to connect with an inside surface of a cooling tube.

5. The cooling apparatus of claim 1, further configured to cooperate with a plug for providing a closed end to the profile of the inside surface of the porous member, the plug being shaped to correspond to a domed end portion of the molded plastic article.

6. The cooling apparatus of claim 3, further comprising at least one vacuum channel configured to be coupled to the at least one channel formed in an outside surface of the porous member.

7. The cooling apparatus of claim 1, wherein the inside surface of the porous member includes a closed end that is shaped to correspond to a domed end portion of the molded plastic article.

8. The cooling apparatus of claim 7, wherein the porous member further includes a channel extending therethrough at a base of the closed end thereof, the channel being configured to be connected to a low pressure, source to draw the molded plastic article into the tube assembly.

9. The cooling apparatus of claim 1, wherein the porous member has porosity in the range of about 3–20 microns.

10. The cooling apparatus of claim 1, wherein the porous member comprises a porous aluminum.

11. The cooling apparatus of claim 1, further including a cooling structure configured for connection with a heat dissipation path, for cooling the molded plastic article in contact with the inside surface of the porous member.

12. A device for receiving and cooling a just-injection-molded semi-molten plastic article, the cooling device comprising:
   a porous member having (i) an internal surface configured to receive the semi-molten article, and (ii) an external surface;
   wherein the porous member is configured such that the just-injection-molded semi-molten article is moved substantially against the internal surface by a pressure differential between the external surface and the internal surface.

13. The device according to claim 12, further comprising low pressure structure for applying the pressure differential between the external surface and the semi-molten article.

14. The device according to claim 12, wherein the porous member is configured as a removable insert to be removable from an injection molding tube assembly.

15. An apparatus for use in a post mold device, said apparatus capable of vacuum-forming of a just-molded malleable injection molded plastic article, comprising:
   a tubular porous member configured to be removably installed within the post mold device, the tubular porous member having (i) a porous inside surface that is profiled to substantially reflect at least a portion of an outside surface of the molded plastic article, and (ii) a porous outside surface, the porous inside surface and the porous outside surface being configured to provide a pressure differential therebetween to cause a nonsolid molded plastic article within the porous member to contact at least a portion of the porous member inside surface so that a profile of the molded plastic article reflects a profile of the porous member inside surface.

16. The apparatus according to claim 15, further comprising a channel configured to provide low pressure to the tubular porous member outside surface.

17. The apparatus according to claim 15, further comprising a vacuum device, coupled to the channel, to cause both (i) an exterior cylindrical surface of the molded plastic article and (ii) an exterior distal end of the molded plastic article to contact the interior surface of the porous member.

18. A forming apparatus configured to cooperate with an evacuation pump for the vacuum-forming of a just-molded malleable injection molded plastic article, comprising:
   a porous member having a porous inside surface that is profiled to substantially reflect at least a portion of an outside surface of the molded plastic article and that supports the evacuation of air therethrough to cause the malleable molded article within the at least one porous member to expand to contact the porous inside surface to cause a substantial portion of the outside surface of the malleable article, upon cooling, to attain a profile substantially corresponding to the profile of the inside surface of the porous member.

19. A tool configured to be carried by an injection molding robot arm, comprising:
   a carrier configured to be coupled to the injection molding robot arm, said carrier carrying at least one molded article cooling device;
   at least one porous member installed in the at least one molded article cooling device, the at least one porous member having a porous inside surface that supports the evacuation of air therethrough to cause a malleable molded article within the at least one porous member to expand to contact the porous inside surface; and
   an evacuation structure configured to evacuate the air through the at least one porous member.

20. An injection mold robot, comprising:
   an arm member configured to be disposed adjacent an injection molding machine;
   a carrier configured to be coupled to the arm member, said carrier carrying at least one molded article cooling device;
   at least one porous member configured to be removably installed in the at least one molded article cooling device, the at least one porous member having a porous inside surface that supports the evacuation of air therethrough to cause a malleable molded article within the at least one porous member to expand to contact the porous inside surface; and
   an evacuation structure configured to evacuate the air through the at least one porous member.

21. An injection molding machine, comprising:
   mold structure that molds at least one plastic article;
   at least one cooling cavity configured to hold and cool the at least one plastic article after the at least one plastic article is molded by the mold structure;
   at least one porous member configured to be removably installed in the at least one cooling cavity, the at least one porous member having a porous inside surface that supports the evacuation of air therethrough to cause a non-solid molded plastic article within the at least one porous member to expand and contact the at least one porous member inside surface, a profile of the molded plastic article corresponding to a profile of the porous member inside surface; and
   an evacuation structure configured to evacuate the air through the at least one porous member.

* * * * *